UNITED STATES PATENT OFFICE.

HEINRICH BECHHOLD, OF FRANKFORT-ON-THE-MAIN, GERMANY, ASSIGNOR TO CHEMISCHE FABRIK LADENBURG G. M. B. H., OF LADENBURG, GERMANY.

DISINFECTANT.

1,232,187.   Specification of Letters Patent.   Patented July 3, 1917.

No Drawing.   Application filed December 28, 1909.   Serial No. 535,253.

*To all whom it may concern:*

Be it known that I, HEINRICH BECHHOLD, a subject of the King of Prussia, and residing at Frankfort-on-the-Main, Germany, have discovered a certain new and Improved Disinfectant, of which the following is a specification.

My invention relates to disinfectants and is based upon the discovery that for the purposes of disinfection, halogenated naphthols, especially the chlorinated and brominated betanaphthols possess a particularly high bacteria-destroying power. Extensive experiments, which led to the present discovery, have shown that the disinfecting power of the betanaphthols against certain bacteria is increased by the introduction of halogen atoms up to the number of 4, into the molecule of said betanaphthols. If more halogen atoms are introduced, these do not increase the disinfecting action attained through the addition of 4 atoms only. It has also been ascertained that the various halogen derivatives of beta-naphthol affect the different bacteria in a very varying degree. For example, tri- and tetrabrom betanaphthols have an especially strong influence upon staphylo- and strepto-cocci; dichlor-betanaphthol upon paratyphus bacilli; dibrom betanaphthol upon bacteria coli. This strong disinfecting action of isolated halogen naphthols permits their effective application in certain cases, either alone or mixed with other disinfecting agents, as other halogenated naphthols.

In addition to these essential properties of the halogenated betanaphthols as disinfecting agents, there are two other circumstances which seem to make these two products especially adapted for the above purposes, namely, the nonpoisonous character toward the human organism and the almost entire lack of smell.

As a result of the insolubility of the free halogenated betanaphthols in water and in consequence of the ready solubility of their salts in water, and furthermore, owing to the more or less ready solubility in alcohol, oils, fats, solutions of salicylates and salt solutions of various sulfo acids, extensive employment of these disinfecting agents is made possible in appropriate cases.

The application of my invention may be illustrated by the following examples:—Tribrom betanaphthol is dissolved in a sufficient quantity of soda-lye and diluted until 1 gram tribrom betanaphthol is contained in 100 liters water (1:100000); of which place 2 ccm. to 2 ccm. bouillon and infect these 4 ccm. with 2 drops of a 24-hour culture of staphylococci bouillon. The staphylococci will not reach development.

Taken in a proportion of 1%, such a solution of tribrom betanaphthol will destroy an agar-culture of staphylococci in three minutes.

Let 5 grams dibrom betanaphthol be dissolved in 100 grams of an alcoholic solution of a potash soap, of which 1 ccm. is poured in 6.5 liters water (1:130,000), 2 ccm. of this diluted mixture are added to 2 ccm. bouillon, which is infected with 2 drops of a 24-hour culture of coli-bouillon, when the bacteria will not reach development.

If 400 ccm. water are added to this solution of dibrom betanaphthol in an alcoholic potash soap solution, so that the solution contains 1% dibrom betanaphthol, this will destroy an agar-culture of coli in three minutes. The addition of water has the effect of freeing the disinfecting agent in the form of a milky emulsion or suspension.

As above stated, among the halogenated beta-naphthols the chlorinated and brominated have been found the most effective and are substantial equivalents of each other. Consequently in the following claim the expression "brominated beta-naphthol" is employed with the distinct understanding that a chlorinated beta-naphthol is its substantial equivalent.

I claim as my invention:

As a new article of manufacture, a disinfecting solution containing a chlorinated or brominated beta-naphthol having not less than three and not more than four halogen atoms per molecule, said material being dissolved in an alcoholic solution of a potash soap, said disinfecting solution producing when diluted with water, a milky solution, substantially as described.

In testimony whereof I have signed my name to this specification, in the presence of two subscribing witnesses.

HEINRICH BECHHOLD.

Witnesses:
  JEAN GRUND,
  CARL GRUND.